(12) United States Patent
Spunar et al.

(10) Patent No.: US 11,110,775 B2
(45) Date of Patent: Sep. 7, 2021

(54) AIRFLOW TURNING DEVICE FOR HVAC SYSTEM

(71) Applicants: DENSO International America, Inc., Southfield, MI (US); DENSO CORPORATION, Kariya (JP)

(72) Inventors: Nicholaus Spunar, Southfield, MI (US); Paul Laurentius, Westland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 155 days.

(21) Appl. No.: 16/160,507

(22) Filed: Oct. 15, 2018

(65) Prior Publication Data

US 2020/0114726 A1 Apr. 16, 2020

(51) Int. Cl.
*B60H 1/00* (2006.01)
*B60H 1/24* (2006.01)
*B60N 2/56* (2006.01)

(52) U.S. Cl.
CPC .......... *B60H 1/00564* (2013.01); *B60H 1/24* (2013.01); *B60H 1/0055* (2013.01); *B60H 1/00557* (2013.01); *B60H 1/00821* (2013.01); *B60H 1/00871* (2013.01); *B60H 1/241* (2013.01); *B60H 1/242* (2013.01); *B60N 2/56* (2013.01); *B60N 2/5628* (2013.01)

(58) Field of Classification Search
CPC .......... B60H 1/00564; B60H 1/00557; B60H 1/0055; B60H 1/24; B60H 1/241; B60H 1/242; B60H 1/00821; B60H 1/00871; B60N 2/56; B60N 2/5628

USPC ......................................................... 165/202
See application file for complete search history.

(56) References Cited

U.S. PATENT DOCUMENTS

| | | | | |
|---|---|---|---|---|
| 6,116,375 A | * | 9/2000 | Lorch | G10K 11/172 181/224 |
| 8,425,284 B2 | * | 4/2013 | MacDonald | B60H 1/00028 454/143 |
| 10,704,574 B2 | * | 7/2020 | Liang | F15D 1/0005 |
| 2004/0166794 A1 | * | 8/2004 | Pesch | F24F 13/06 454/152 |
| 2005/0193751 A1 | * | 9/2005 | Nishino | B60H 1/00328 62/173 |
| 2010/0248607 A1 | * | 9/2010 | MacDonald | B60H 1/00028 454/152 |
| 2012/0015598 A1 | | 1/2012 | Bagwell et al. | |
| 2012/0080911 A1 | | 4/2012 | Brykalski et al. | |

(Continued)

FOREIGN PATENT DOCUMENTS

JP 2005178590 A 7/2005

*Primary Examiner* — Joel M Attey
(74) *Attorney, Agent, or Firm* — Harness, Dickey & Pierce, P.L.C.

(57) ABSTRACT

An airflow turning device with airflow control channels for an outlet of a heating, ventilation, and air conditioning (HVAC) case that directs airflow to a plurality of different vehicle outlets. The airflow control channels extend from an inner upstream side of the outlet to an outer downstream side of the outlet. Different ones of the plurality of channels have different lengths to generate a varied pressure drop at the outer downstream side in response to airflow blown into the plurality of channels from the inner upstream side.

11 Claims, 4 Drawing Sheets

(56) References Cited

U.S. PATENT DOCUMENTS

2017/0217282 A1    8/2017  Iyer et al.
2017/0232815 A1*  8/2017  Deneau .............. B60H 1/00064
                                                      454/155

* cited by examiner

AIRFLOW TURNING DEVICE FOR HVAC SYSTEM

FIELD

The present disclosure relates to an airflow turning device for a heating, ventilation, and air conditioning (HVAC) system.

BACKGROUND

This section provides background information related to the present disclosure, which is not necessarily prior art.

In automotive heating, ventilation, and air conditioning (HVAC) systems, certain operating modes require a balance of airflow between different outlets. Specifically, multiple air outlets of the vehicle are controlled by a single outlet on the HVAC case itself. A duct system distributes airflow from the single outlet of the HVAC case to the multiple different air outlets. If the HVAC layout is not capable of meeting the airflow distribution requirements in the case of multiple vehicle outlets being controlled by one HVAC case outlet, current HVAC systems require a second airflow control door that moves in tandem with another door to direct such airflow to control the airflow balance. The present disclosure advantageously corrects multiple outlet airflow imbalance without the need for additional airflow control doors as described in detail herein. One skilled in the art will appreciate that the present disclosure provides numerous additional advantages as explained herein and as one skilled in the art will appreciate.

SUMMARY

This section provides a general summary of the disclosure, and is not a comprehensive disclosure of its full scope or all of its features.

The present disclosure includes an airflow turning device with airflow control channels for an outlet of a heating, ventilation, and air conditioning (HVAC) case that directs airflow to different vehicle outlets. The airflow control channels extend lengthwise from an inner upstream side of the outlet to an outer downstream side of the outlet. Different ones of the plurality of channels have different lengths to generate a varied pressure drop at the outer downstream side in response to airflow blown into the plurality of channels from the inner upstream side.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
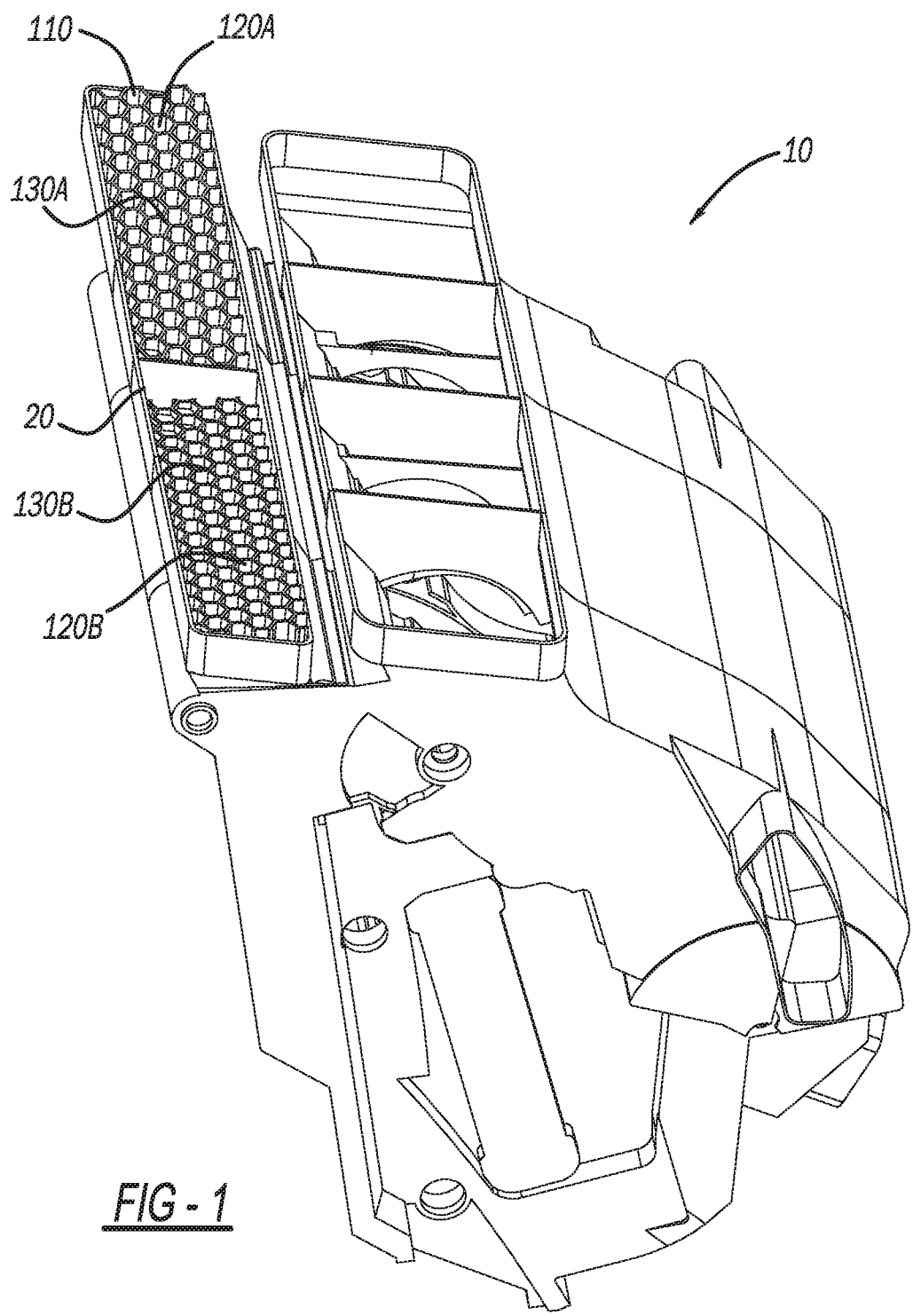
FIG. 1 illustrates an exemplary heating, ventilation, and air conditioning (HVAC) case including airflow control channels at an outlet of the HVAC case in accordance with the present disclosure.
Figure 2:
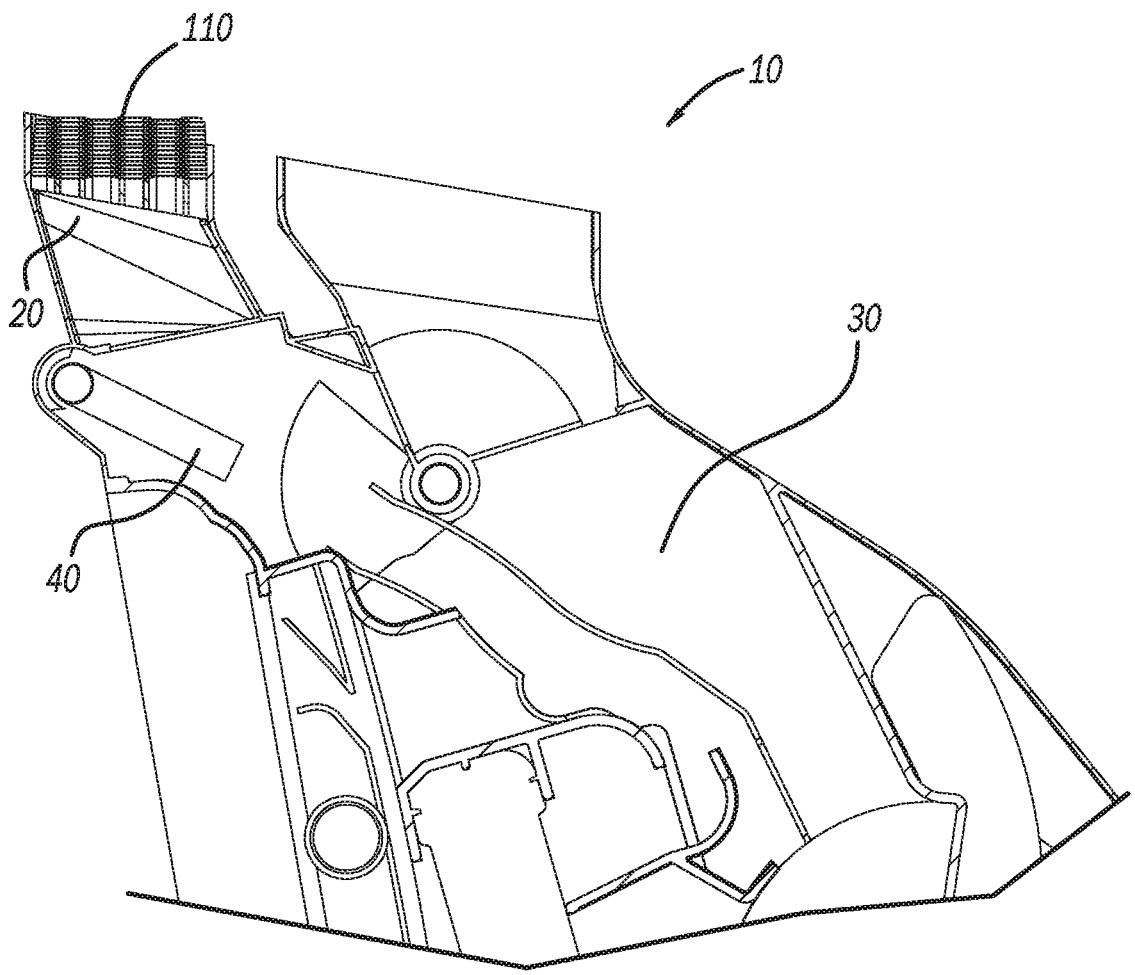
FIG. 2 is a cross-sectional view of the HVAC case of FIG. 1.

FIGS. 1 and 2 illustrate an exemplary heating, ventilation, and air conditioning (HVAC) case at reference numeral 10. The HVAC case 10 may include an evaporator and/or heater core at interior 30 to regulate the temperature of airflow exiting the HVAC case 10, such as through outlet 20 of the HVAC case 10. The outlet 20 is connected to a plurality of different vehicle airflow outlets, such as defrost and demist outlets (see demist outlets DM/DM' and defrost outlets DF/DF' of FIG. 3, for example), or any other suitable plurality of different vehicle outlets. The defrost outlets DF and DF' direct airflow to a windshield of the vehicle, and the demist outlets DM and DM' direct airflow to side windows of the vehicle.

To regulate the intensity and direction of airflow exiting the outlet 20, the present disclosure includes a plurality of airflow control channels 130A and 130B at the outlet 20. The airflow control channels 130A/130B may be integral with the HVAC case 10 at the outlet 20, or defined by any suitable device 110, such as an insert seated at the outlet 20 for example. The insert 110 may be a single integral, monolithic piece. Alternatively, the insert 110 may be modular and may include a first part or portion 120A defining channels 130A, and a second part or portion 120B defining channels 130B.

Figure 3:
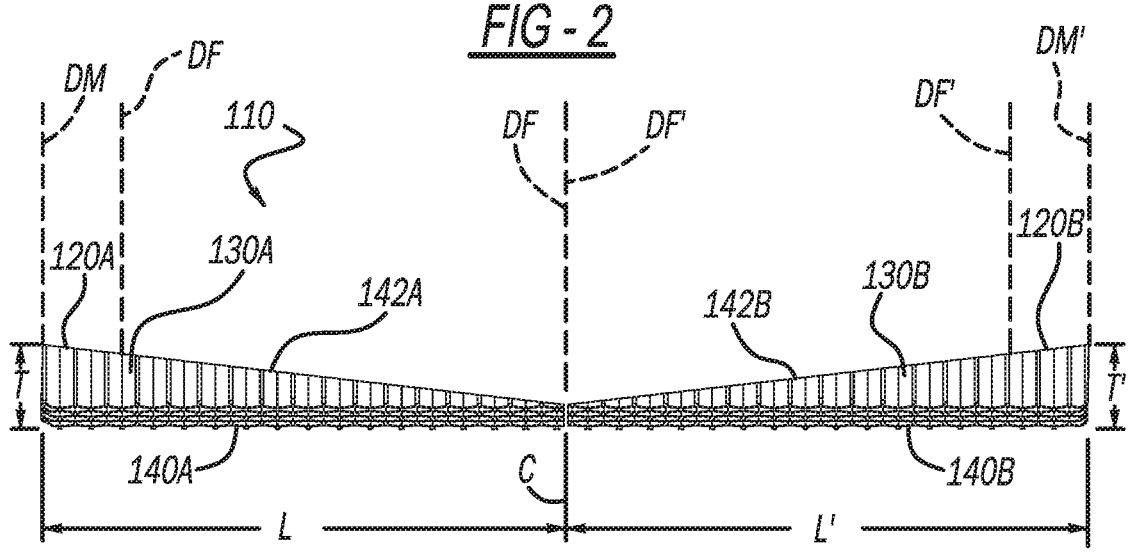
FIG. 3 illustrates the airflow control channels of FIG. 1.

Airflow through the entire outlet 20 may be advantageously regulated by only a single airflow control door, such as door 40 of FIG. 2, notwithstanding that the outlet 20 is connected to multiple vehicle airflow outlets requiring different levels of airflow (such as demist outlets DM/DM' and defrost outlets DF/DF' of FIG. 3, for example). Thus the present disclosure advantageously eliminates the need for multiple airflow control mechanisms (e.g. doors and linkages) to control airflow through the outlet 20 to various different vehicle outlets.

With reference to FIG. 3, the channels 130A/130B have an inner, upstream end 140A/140B, which is opposite to an outer, downstream end 142A/142B. The airflow channels 130A/130B have lengths extending along thicknesses T and T' of the insert 110. The lengths of the channels 130A/130B vary along the length L/L' of the insert 110. The channels 130A/130B are arranged such that the relatively longer channels 130A/130B are arranged at areas of the outlet 20 where relatively greater airflow is desired, and the relatively shorter channels 130A/130B are at areas of the outlet 20 where relatively less airflow is desired. For example and as illustrated in FIG. 3, the longest ones of the airflow control channels 130A are arranged opposite to a vehicle demist outlet DM, and the longest ones of the airflow control channels 130B are arranged opposite to the vehicle demist outlet DM'. The relatively shorter ones of the channels 130A are arranged such that airflow therethrough flows to defrost outlet DF, and the relatively shorter ones of the channels 130B are arranged such that airflow flowing therethrough flows to vehicle defrost outlet DF'.

The relatively longer channels 130A/130B at the demist outlets DM/DM' slow the flow of airflow therethrough to a greater extent than airflow through the channels 130A/130B at the defrost outlets DF/DF', because the channels 130A/130B opposite to the demist outlets DM/DM' are relatively longer than the channels 130A/130B opposite to the defrost outlets DF/DF'. The relatively slower airflow through the longer channels 130A/130B at the demist outlets DM/DM' will create a relatively higher pressure drop at the outer, downstream sides 142A/142B opposite to the relatively longer channels 130A/130B as compared to the pressure drop at the outer, downstream side 142A/142B of the relatively shorter channels 130A/130B. Due to the increased pressure drop, airflow exiting the relatively shorter channels 130A/130B at the defrost outlets DF/DF', will flow outward and away from the center C to the demist outlets DM/DM' to provide additional airflow through the demist outlets DM/DM'. Thus by controlling the lengths of the channels 130A/130B, airflow at the outer, downstream side 142A/142B and through the demist outlets DM/DM' and defrost outlets DF/DF' is controlled without a need for additional airflow control doors and linkages.

Figure 4A:
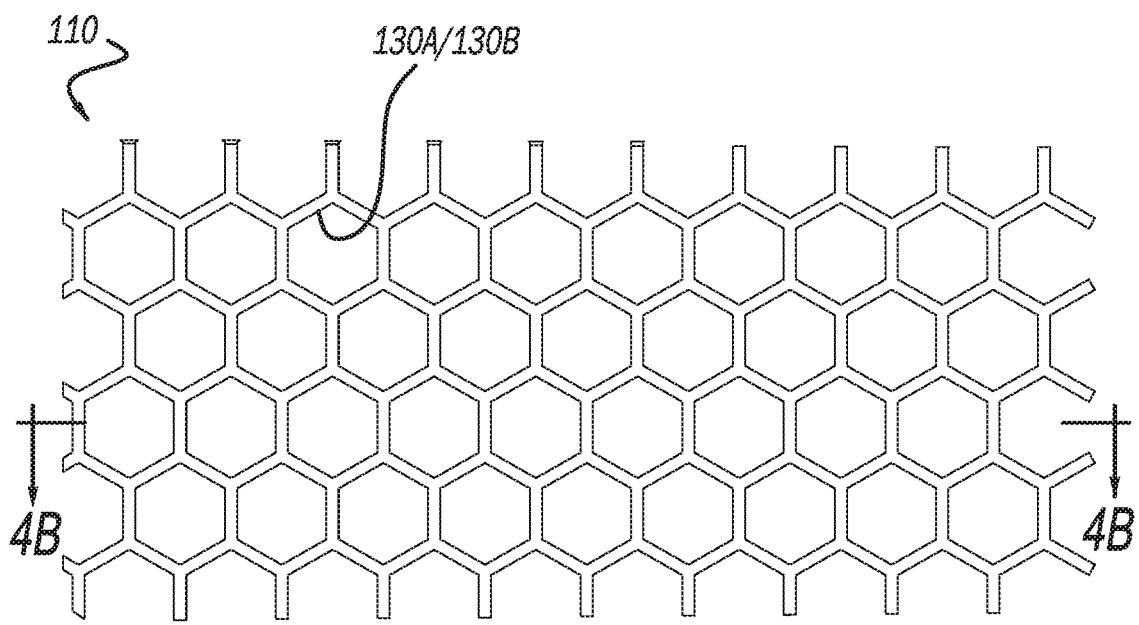
FIG. 4A is a plan view of a plurality of the airflow control channels in accordance with the present disclosure.
Figure 4B:
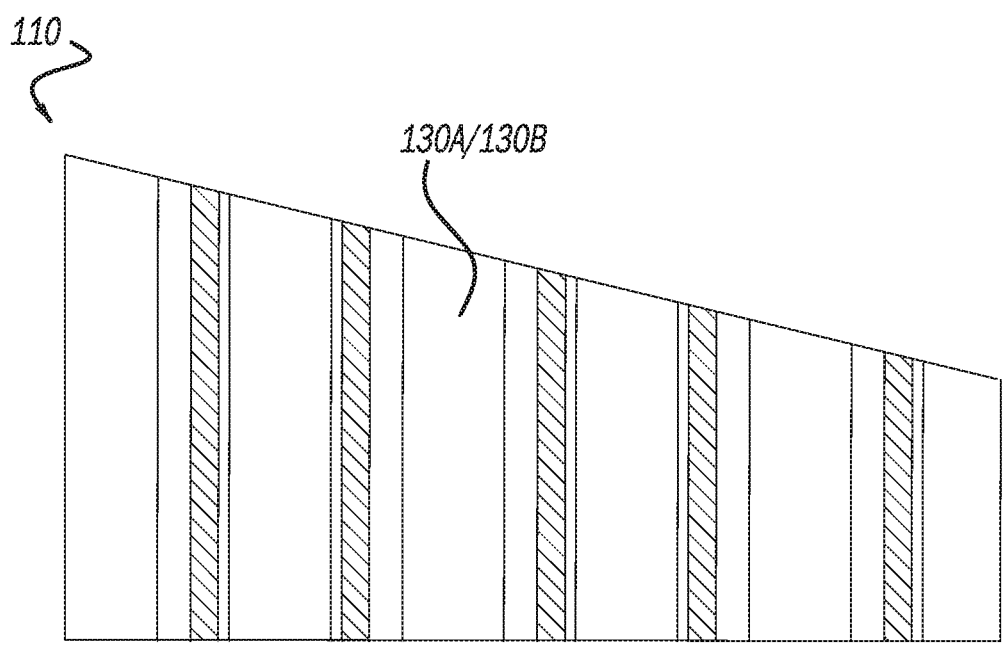
FIG. 4B is a cross-sectional view taken along line 4B-4B of FIG. 4A.
Figure 5:
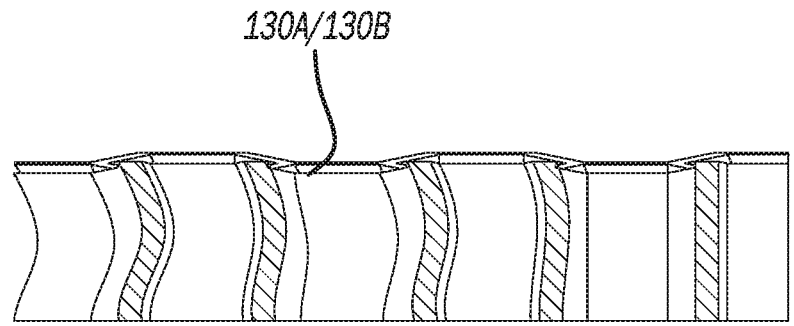
FIG. 5 illustrates a plurality of non-linear airflow control channels in accordance with the present disclosure.
Figure 6:
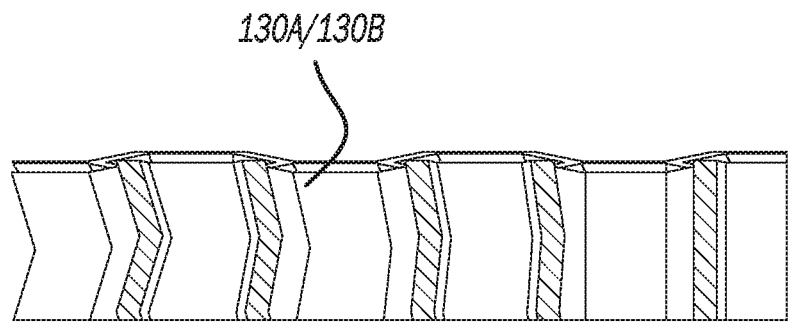
FIG. 6 illustrates a plurality of additional non-linear airflow control channels in accordance with the present disclosure.

With reference to FIGS. 4A and 4B, the channels 130A/130B can have any suitable shape, such as a honeycomb shape. The channels 130A/130B can extend linearly from the inner, upstream end 140A/140B to the outer, downstream end 142A/142B. With reference to FIG. 5, the channels 130A/130B can be configured to extend non-linearly. Thus the varying lengths of the channels 130A/130B may be accomplished by making some of the channels linear, and other ones of the channels non-linear (e.g., curved along lengths thereof to provide the curved channels with effectively a longer length than the linear channels). As illustrated in FIG. 6, the non-linear channels 130A/130B may zig-zag along lengths thereof, as opposed to having curved sidewalls as illustrated in FIG. 5.

Figure 7:
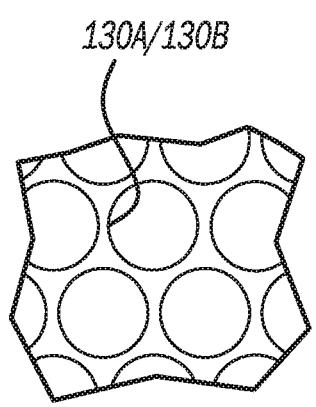
FIG. 7 is a plan view of a plurality of circular airflow control channels in accordance with the present disclosure.
Figure 8:
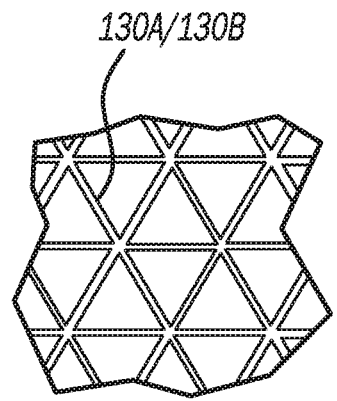
FIG. 8 illustrates a plurality of triangular airflow control channels in accordance with the present disclosure.

The channels 130A/130B have any suitable cross-sectional shapes. For example and as illustrated in FIGS. 4A and 4B, the channels 130A/130B may have a honeycomb shape. With reference to FIG. 7, the channels 130A/130B may have a circular shape in cross-section. And with reference to FIG. 8, the channels 130A/130B may have a triangular shape in cross-section.

Although the airflow control channels 130A and 130B are described above as being arranged at the defrost outlets DF/DF' and the demist outlets DM/DM', the airflow control channels 130A/130B may be arranged at any other suitable outlet of the HVAC case 10, which directs airflow to multiple vehicle airflow outlets, such as front and rear foot outlets of a passenger cabin for example. The present disclosure thus advantageously reduces overall manufacturing times and production costs by eliminating the need for multiple airflow control doors and linkages at outlets of the HVAC case 10 that direct airflow to multiple vehicle outlets. Furthermore, the reliability of the HVAC case 10 is increased because the case 10 includes fewer linkages, which under rare circumstances may not operate as intended.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An airflow turning device for an outlet of a heating, ventilation, and air conditioning (HVAC) case that directs airflow to a plurality of different vehicle outlets, the device comprising:
    a plurality of channels defined by the device, each one of the plurality of channels extending across a thickness of the device from an inner upstream side of the device to an outer downstream side of the device;
    wherein different ones of the plurality of channels extend different distances relative to a direction of airflow through the device to generate a varied pressure drop at the outer downstream side in response to airflow blown into the plurality of channels from the inner upstream side;
    wherein the plurality of channels include first channels having a first length and second channels having a second length; and
    wherein the varied pressure drop includes a first pressure drop on the outer downstream side of the device opposite to the first channels having the first length, and a second pressure drop on the outer downstream side of the device opposite to the second channels having the second length, the first pressure drop is higher than the second pressure drop and the first channels are longer than the second channels.

2. The device of claim 1, wherein the different ones of the plurality of channels extend different distances at different positions along a length of the device.

3. The device of claim 1, wherein the device defines a non-level gradient along the length thereof across the outer downstream side.

4. The device of claim 1, wherein the plurality of channels are arranged as a honeycomb shape.

5. The device of claim 1, wherein at least one of the plurality of channels has less than six sides in cross-section.

6. The device of claim 1, wherein the plurality of channels extend linearly from the inner upstream side to the outer downstream side.

7. The device of claim 1, wherein the device is seated at the outlet of the HVAC case.

8. A heating, ventilation, and air conditioning (HVAC) case comprising:
    a single case outlet that directs airflow to a plurality of different vehicle airflow outlets; and
    a plurality of channels at the single case outlet, the plurality of channels extending lengthwise from an inner upstream side to an outer downstream side;
    wherein across the single case outlet different ones of the plurality of channels have different lengths relative to a direction of airflow through the HVAC case to generate a varied pressure drop at the outer downstream side in response to airflow blown into the plurality of channels from the inner upstream side;
    wherein the plurality of channels include first channels having a first length and second channels having a second length; and
    wherein the varied pressure drop includes a first pressure drop on the outer downstream side opposite to the first channels having the first length, and a second pressure drop on the outer downstream side opposite to the second channels having the second length, the first pressure drop is higher than the second pressure drop and the first channels are longer than the second channels.

9. The HVAC case of claim 8, wherein the plurality of channels define a non-level gradient across the outer downstream side.

10. The HVAC case of claim 8, wherein the plurality of channels are arranged as a honeycomb shape.

11. The HVAC case of claim 8, wherein the plurality of different vehicle airflow outlets include a demist outlet and a defrost outlet; and wherein the first channels are configured to be arranged opposite to the demist outlet and the second channels are configured to be arranged opposite to the defrost outlet.

\* \* \* \* \*